United States Patent [19]

Maejima

[11] Patent Number: 4,758,852

[45] Date of Patent: Jul. 19, 1988

[54] PHOTOGRAPHIC FILM PACKAGE

[75] Inventor: Kunio Maejima, Tokyo, Japan

[73] Assignee: Fuji Photo Film Co., Ltd., Kanagawa, Japan

[21] Appl. No.: 86,802

[22] Filed: Aug. 19, 1987

[30] Foreign Application Priority Data

Aug. 19, 1986 [JP]   Japan ............................ 61-126247[U]

[51] Int. Cl.<sup>4</sup> ............................................. G03B 17/02
[52] U.S. Cl. ...................................... 354/75; 354/288
[58] Field of Search ................................... 354/75, 288

[56]   References Cited

U.S. PATENT DOCUMENTS 4,226,517  10/1980  Skarman ............................... 354/75
4,345,825  8/1982  Matteson ......................... 354/412 X Primary Examiner—Michael L. Gellner
Attorney, Agent, or Firm—Young & Thompson

[57]   ABSTRACT

A lens-fitted photographic film package comprises a film, a container wherein the film is contained, and a taking lens all of which are combined as a unit. The film has a MTF value of above 1.1 for a spatial frequency in the range of 5 to 10 lines/mm and the taking lens has a MTF value between 0.47 and 0.73 for a spatial frequency of 20 lines/mm.

3 Claims, 4 Drawing Sheets

PHOTOGRAPHIC FILM PACKAGE

BACKGROUND OF THE INVENTION

The present invention relates to a lens-fitted photographic film package having a simple exposure function, and more particularly to a lens-fitted photographic film package which is capable for providing pictures having a high image quality.

It has heretofore been customary to take pictures by using a camera and a film which are separately sold. Quite often, however, amateur photographers do not have their camera with them. Therefore, it often happens that one who takes no camera along wants to take pictures. At such times, the conventional camera and film systems are inconvenient.

Accordingly, it is desirable to provide a lens-fitted film package provided with simple exposing means which can be sold at a low cost comparable to a conventional film and is available wherever ordinary photographic film is sold. Such a lens-fitted film package, after the exposure of all frames of the film, is forwarded to a photo shop without removing the exposed film. Photographic products that may be considered to be similar to such a lens-fitted film package having exposing means are proposed in, for example, U.S. Pat. No. 2,933,027 and Japanese Utility Model Publ. No. 39-33,924. However, such a film package taught by either of these references has by no means been successfully put into practical use. Because as a practical matter the lens-fitted film package having exposure means has to be sold at a cost as low as conventional photographic film, the film package is provided with low-cost exposure means which comprises a simplified taking lens and shutter with their associated elements. Therefore, it is difficult to achieve an image quality that compares favorably with that obtained by the use of a conventional film and camera system.

OBJECT OF THE INVENTION

It is, therefore, an object of the present invention to provide a lens-ftted film package which can provide an improved image quality of pictures.

It is another object of the present invention to provide a lens-fitted film package with a simplified taking lens and shutter incorporated therein which can be cheap.

SUMMARY OF THE INVENTION

For accomplishing the above and other objects, the lens-fitted film package according to the present invention comprises combinations of photographic films having particular MTF values and taking lenses having particular MTF values. Due to the particular combination of a film and a taking lens, the lens-fitted film package with simplified exposure means, which can provide pictures with a satisfactory image quality, achieves low cost. Specifically, the lens-fitted film package according to the present invention comprises a film having a MTF value of above 1.1 for five to ten lines/mm in spatial frequency, contained in a lightight film package, and an optical lens having a MTF value between 0.47 and 0.73 for 20 lines/mm in spatial frequency, which is so arranged in combination with its associated exposure elements as to form an image on the film. Such a particular combination of film and lens results in a satisfactory image quality of the resulting picutures.

It is well known to use MTF values as an indicator of image definition. It is also known that the MTF value of a picture image can be approximated by the product of MTF values of a lens and a film on which the picture image is formed by the lens. However, this product is often at variance with the actual quality of picture image. In addition, it has not heretofore been known which MTF values of images are favorable. Furthermore, it has heretofore been unknown which properties of films and taking lenses are essential to satisfy the requirement not only of a low-cost taking lens for the lens-fitted film package but also of a good image quality of the pictures.

With these points as background, the present inventors, as a result of examining various combinations of films having different properties and taking lenses available at a reasonably low cost, have discovered that pictures with a satisfactory image quality can be provided by a lens-fitted film package comprising the combination of a film having a MTF value of above approximately 1.1 for five to ten lines/mm in spatial frequency and a taking lens having a MTF value between approximately 0.47 and 0.73 for 20 lines/mm in spatial frequency.

BRIEF DESCRIPTION OF THE INVENTION

DETAILED DESCRIPTION OF THE INVENTION

Figure 1:
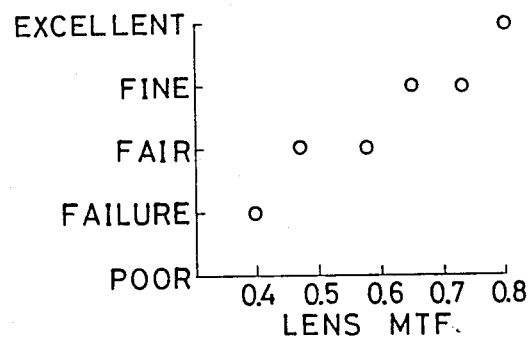
FIGS. 1a to 1c are graphs showing the results of evaluation of image quality of pictures taken by the lens-fitted film packages comprising combinations of films having particular MTF values and taking lenses having particular MTF values.
Figure 1:
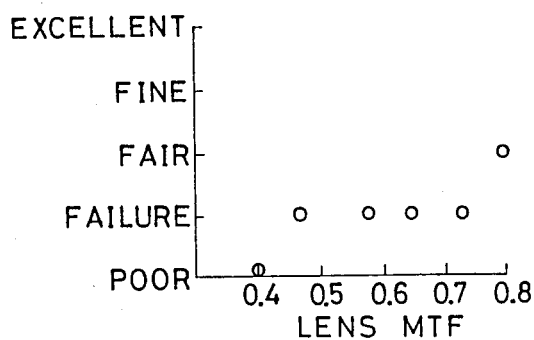
Figure 1:
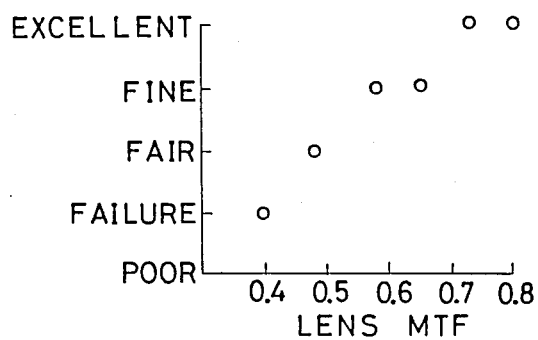

FIGS. 1a to 1c show the results of evaluation of image quality of pictures resulting from various combinations of films and lenses. For the evaluation of image quality, sample color prints of E-size (82.5×120 mm) are made from a 110-size color negative film and enlarged to be 6.7 times as large as the image frame of the 110-size color negative film. The sample pictures are rated by five evaluators in one of five grades, namely excellent, fine, fair, failure, and poor, according to their image qualities. In each of FIGS. 1a, 1b, 1c, averge image qualities are shown for pictures taken by taking lenses having various MTF values, namely 0.40, 0.47, 0.58, 0.65, 0.73, and 0.80 for a spatial frequency of 20 lines/mm. However, the MTF value of a color negative film used in combination with each taking lens is between 1.1 and 1.2 in FIG. 1a, between 1.0 and 1.05 in FIG. 1b, and between 1.2 and 1.3 in FIG. 1c, for a spatial frequency between five and ten lines/mm, respectively.

It is to be noted that the MTF values are measured in such a way that a 110-size color film with a film speed of ASA 100 is contact-exposed to a MTF measuring optical wedge by using an illumination light of a given color temperature, 4800° K., through a green filter, and then processed according to Fuji Film Color Negative Processing CN-16. The finished color film is measured with a microphotometer having a measuring slit of $2_{\mu m} \times 100_{\mu m}$ and an illumination slit of $20_{\mu m} \times 150_{\mu m}$.

Figure 2:
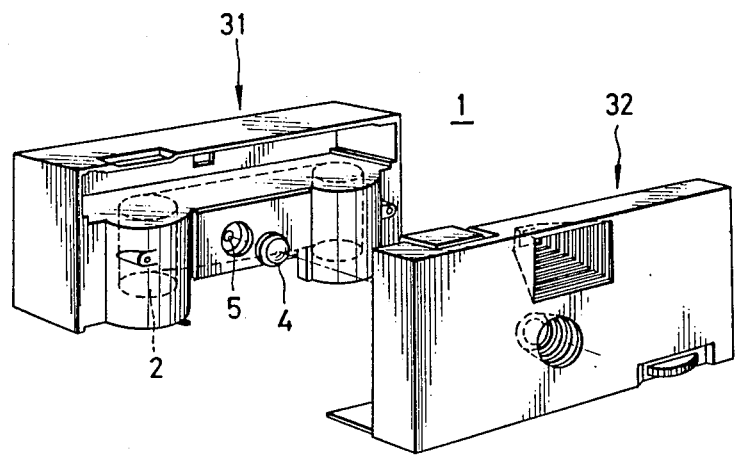
FIG. 2a is an exploded front perspective view showing the lens-fitted film package embodying the present invention.
FIG. 2b is a rear perspective view thereof with the film cartridge removed.
Figure 2:
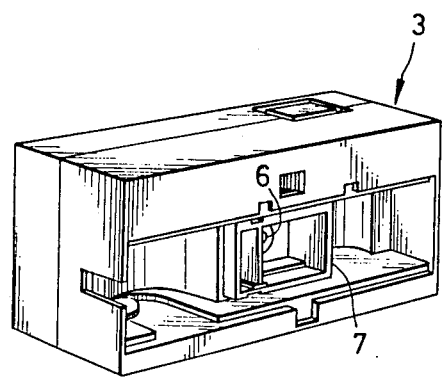

The samples pictures are prepared by photographing each time the same subject outdoors, three exposures for each taking lens which is incorporated in a film package 1 shown in FIG. 2. The film package 1 comprises a receptacle 3 containing the above-mentioned color film 2 therein and the taking lens mounted on the receptacle 3. The color film 2 was, after exposure, subjected to ordinary color film photofinishing.

The taking lenses with a few exceptions were of the type comprising a single plastic lens having a focal length of 25.6 mm. The exposure of the sample film was made under F:11 and a shutter speed of 1/100 sec.

For the evaluation of the prepared sample pictures, the pictures were rated fair which were considered to have at least a satisfactory image quality, image quality depending on contrast and sharpness.

It is apparent from the graph shown in FIG. 1a that pictures having at least a satisfactory image quality can be obtained by the taking lens having a MTF value of above 0.47. The taking lenses used to give the results shown in FIG. 1a is a single plastic lens having a focal length of 25.6 mm.

From the graph shown in FIG. 1b, it is apparent that the taking lenses having a MTF value of 0.8 can provide pictures which are evaluated to have at least a satisfactory image quality. However, in this case, each taking lens comprises not a single lens but a group of three component lens elements. Therefore, if the taking lens having a MTF value of 0.8 is used in combination with color negative film having a MTF value between 1.0 and 1.05, it is generally difficult to provide the taking lens at a low cost because the number of component lens elements of a taking lens which can be supplied at a low cost is at most three. If the number of component lens elements becomes more than three, the cost of a taking lens will often increase sharply.

FIG. 1c shows the results of evaluation of pictures made from a color film having a MTF value of 1.2 to 1.3 for a spatial frequency between five to ten lines/mm, which is exposed through taking lenses having the same MTF values as the taking lenses in the cases shown in FIGS. 1a and 1b. From the graph shown in FIG. 1c, it is apparent that pictures having at least a satisfactory image quality can be obtained with a taking lens having a MTF value of above 0.47.

Figure 3:
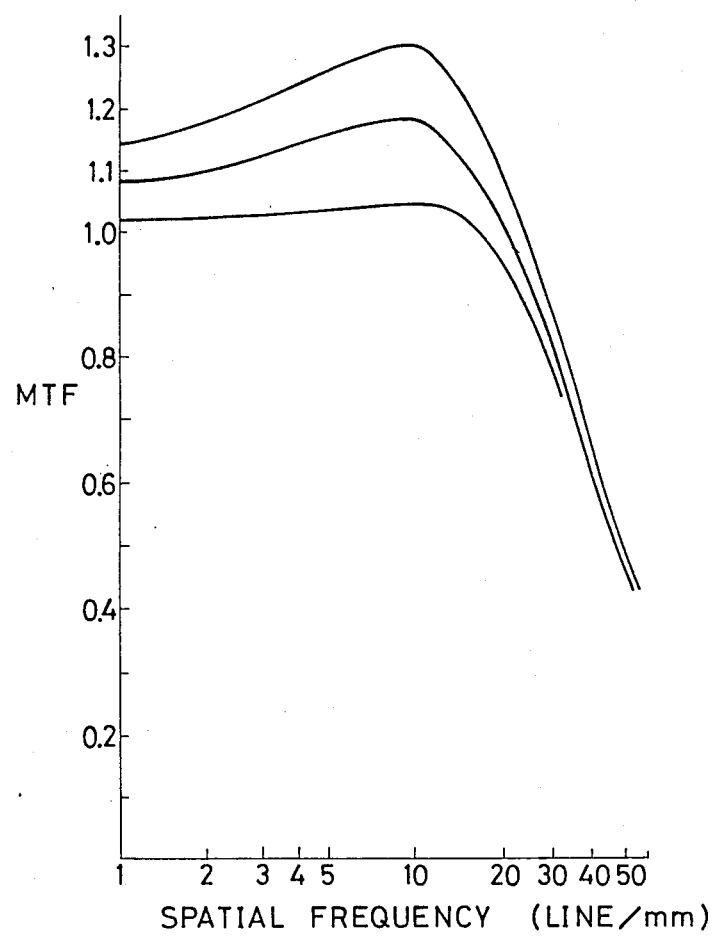
FIGS. 3a and 3b are graphs showing relationships between MTF value and spatial frequency for the photographic color films and the taking lenses, respectively, used in the image quality evaluation shown in FIGS. 1a to 1c.
Figure 3:
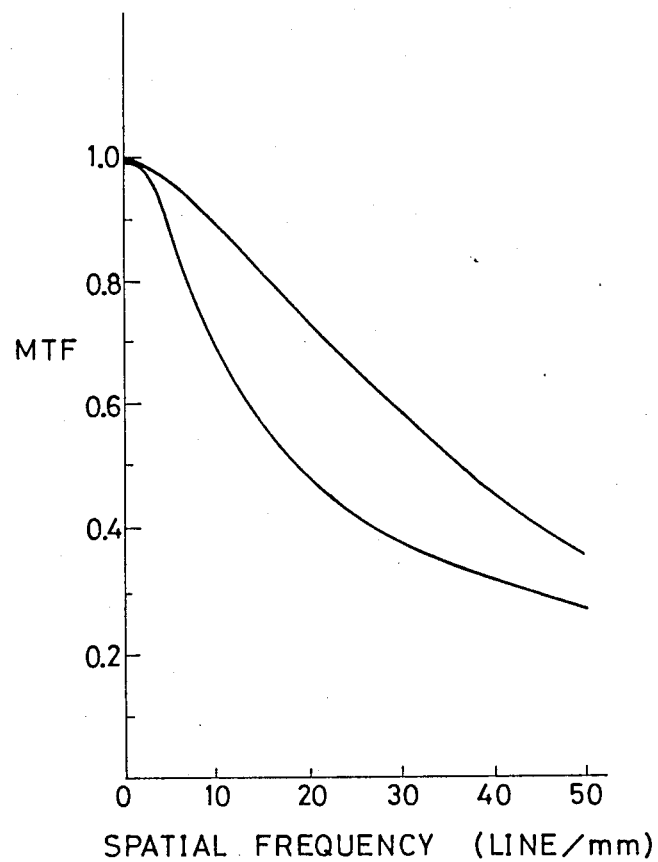

FIGS. 3a and 3b show curves of the relationship between MTF value and spatial frequency. More particularly, the curves shown in FIGS. 3a are drawn for the films used in the respective experiments of FIGS. 1a, 1b and 1c. The curves shown in FIG. 3b are drawn for the taking lenses. The upper curve in FIG. 3b is drawn for the taking lens which comprises a single aspherical lens having a MTF value of 0.73 for a spatial frequency of 20 lines/mm. The lower curve is drawn for the one having a MTF value of 0.47.

The color negative film used for the experiment of which the result is shown in FIG. 1c comprises a multi-layer structure. The color negative film has basically the same layer arrangement as the photographic film ISO (International Standardization Organization) 100. The color negative film comprises the fourteen layers described below, coated in that order on a cellulose triacetate film having a subbing layer.

First layer (Antihalation Layer)

A gelatin layer containing black colloidal silver and an ultraviolet-absorbing agent.

Second Layer (Intermediate Layer)

A gelatin layer containing a magenta-colored cyan-dye-forming coupler for printing adjustment. Third Layer (Slow-Speed Red-Sensitive Emulsion Layer, Silver: 0.4 g/m$^2$)

A gelatin layer containing an emulsion of silver iodobromide (containing 2 mol % of silver iodide) of mean grain size of 0.3 m which is red-sensitized with cyanine-type sensitizing dyes, 2-ureido-5-acylamino-substituted phenol couplers, and a naphthol-type colored coupler capable of splitting off a magenta dye.

Fourth Layer (Medium-Speed Red-Sensitive Emulsion Layer, Silver: 0.7 g/m$^2$)

A gelatin layer containing an emulsion of silver iodobromide (containing 5 mol % of silver iodide) of mean grain size of 0.5 μm which is red-sensitized with cyanine-type sensitizing dyes, 2-ureido-5-acylamino-substituted phenol-type couplers, and a naphthol-type colored coupler capable of splitting off a magenta dye.

Fifth Layer (High-Speed Red-Sensitive Emulsion Layer, Silver: 1.0 g/m$_2$)

A gelatin layer containing an emulsion of silver iodobromide (containing 10 mol % of silver iodide) of mean grain size of 0.7 μm which is red-sensitized with cyanine-type sensitizing dyes, ureido-substituted phenol-type couplers capable of splitting off a phenoxy group, and highly reactive naphthol-type couplers.

Sixth Layer (Intermediate Layer)

A gelatin layer containing 2-hexadecyl-5-sulfohydroquinone.

Seventh Layer (Slow-Speed Green-Sensitive Emulsion Layer, Silver: 0.3 g/m$^2$)

A gelatin layer containing an emulsion of silver iodobromide (containing 4 mol % of silver iodide) of mean grain size of 0.3 μm which is green-sensitized with cyanine-type sensitizing dyes, a yellow-colored magenta-dye-forming coupler, a polymer coupler of the pyrazolone type capable of splitting off a pyrazole group, and a diffusible DIR (Development Inhibitor-Releasing) coupler having the following structural formula:

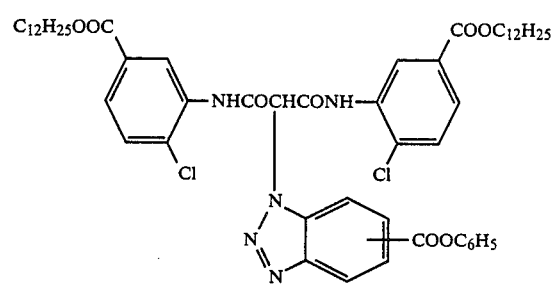

Eighth Layer (Medium-Speed Green-Sensitive Emulsion Layer, Silver: 0.4 g/m$^2$)

The same gelatin layer as the seventh layer with the exception that the emulsion is replaced by an emulsion of silver iodobromide (containing 5 mol % of silver iodide) of mean grain size of 0.5 μm which is green-sensitized with cyanine-type sensitizing dyes.

Ninth Layer (High-Speed Green-Sensitive Emulsion, Silver: 0.9 g/m$^2$)

A gelatin layer containing an emulsion of silver iodobromide (containing 6 mol % of silver iodide) of mean grain size of 0.7 μm which is green-sensitized with cyanine-type sensitizing dyes, a 2-equivalent pyrazolone-type coupler (which is capable of splitting off a phenyl-mercapto group or a pyrazole-group), a non-diffusible DIR coupler of the pibaloyl type capable of splitting off a 5- or 6-(N-methyl benzo thiazolylidene amino)-1-benzo triazolyl group.

Tenth Layer (Yellow Filter Layer)

A gelatin layer containing yellow colloidal silver and dialkylhydroquinone.

Eleventh Layer (Low-speed Blue-Sensitive Emulsion, Silver: 0.4 g/m$^2$)

A gelatin layer containing an emulsion of silver iodobromide (containing 4 mol % of silver iodide) of mean grain size of 0.3 μm which is sensitized with cyanine-type sensitizing dyes, and benzoyl couplers capable of splitting off hydantoin.

Twelfth Layer (High-Speed Blue-Sensitive Emulsion, Silver: 0.5 g/m$^2$)

A gelatin layer containing an emulsion of silver iodobromide (containing 10 mol % of silver iodide) of mean grain size of 1.5 μm which is sensitized with cyanine-type dyes, and benzoyl coupler capable of splitting off hydantoin.

Thirteenth Layer (First Protective Layer)

A gelatin layer containing an ultraviolet absorbing agent.

Fourteenth Layer (Second Protective Layer)

A gelatin layer containing fine silver iodide of grain size of 0.07 μm, a formaldehyde scavenger, a gelatin hardener, and a matting agent.

The above photographic color film is described in more detail in, for example, Japanese Pat. Unexam. Publ. No. 61-258,250.

Although the main factors on which the MTF value of a photographic film depends are the thickness of each layer, the grain size of the silver halide, etc., it is preferable to use a non-diffusible DIR coupler capable of splitting off a diffusible development restrainer (which is sometimes referred to as a diffusible DIR coupler) or a diffusible DIR hydroquinone having a similar capability, so as to obtain a film which can provide pictures with a good image quality when used in combination with a low cost taking lens. For the diffusible DIR coupler, it is desirable to use a timing-type DIR coupler capable of splitting off 1-phenyl-5-mercaptotetrazole having a water-soluble group such as a p-hydroxy group or a diffusible DIR coupler capable of splitting off 2-mercapto-5-methyl-1,3,4-oxadiazole. In particular, as is disclosed in U.S. Pat. No. 4,477,563, DIR couplers capable of splitting off a restrainer having hydrolysis groups may be preferably used.

As is described above, according to the present invention, the lens-fitted film package which comprises a film and a taking lens both having a particular range of MTF values can provide pictures with a favorable image quality, in particular an excellent sharpness. Moreover, color films which contain the above-described DIR couplers are generally improved as to MTF property, in particular, for low spatial frequencies. Due to the improved MTF of the film, prints made from the film generally cause amateur photographers to feel they are enjoying improved image quality.

A film containing the above-described DIR couplers exhibits a reduction of flare in addition to the improved MTF property. Due to this reduction of flare, the lens-fitted film package can cut the cost of providing flare-preventing means such as an anti-reflection coating applied to the taking lens, a diaphragm, or the like. Therefore, the use of film containing the above-described DIR couplers noticeably contributes to the lens-fitted film package being able to be manufactured at a low cost.

In the above described embodiments, the evaluation was conducted as to the sample pictures made from the 110-type color photographic film. However, as long as prints to be evaluated have the same enlargement ratio, for example 6.7 times as large as the original negative in this embodiment, the result of evauation of image quality is independent of negative size.

In addition to the above cases, a similar evaluation was conducted as to sample films exposed by taking lenses of F:8 and F:5.6. As a result of this latter evaluation, the same effect was confirmed as long as the sample films and lenses have MTF values similar to those of the above-described sample films and lenses. However, considering the number of lens components, the short depth of focus, and the like, of the taking lens of F:5.6, the taking lens of F:5.6 may be considered to be unsuitable from the economic point of view for a lens-fitted film package of simple exposure function.

Although the above description has been directed to lens-fitted film packages containing color film, it is to be understood that black-and-white films can be used, as long as they have MTF values similar to those of the above-described sample films. Furthermore, although the lens-fitted film package is constructed in the form shown in FIG. 2, it may be constructed in any way, for example as taught by the above-mentioned U.S. Pat. No. 2,933,027 or Japanese Utility Model Publ. No. 39-33,942.

Although the present invention has been fully described by way of the preferred embodiments thereof with reference to the accompanying drawing, it is to be understood that various changes and modifications will be apparent to those skilled in the art. Therefore, unless otherwise such changes and modifications depart from the true scope of the present invention, they should be construed as being included therein.

What is claimed is:

1. A photographic film package comprising:
   a film container;
   a film contained in said film container which has a MTF value of above 1.1 for a spatial frequency in the range of 5 to 10 lines/mm; and
   a taking lens mounted on said film container to expose said film, said taking lens having a MTF value between 0.47 and 0.73 for a spatial frequency of 20 lines/mm.

2. A photographic film package as defined in claim 1, wherein said lens is a single plastic lens.

3. A photographic film package as defined in claim 1, wherein said lens is a single aspherical lens.

* * * * *